(12) United States Patent
Yamaguchi et al.

(10) Patent No.: US 6,301,199 B1
(45) Date of Patent: Oct. 9, 2001

(54) MAGNETO-OPTICAL RECORDING MEDIUM AND RECORDING/REPRODUCING APPARATUS THEREFOR IN WHICH RECORDED MAGNETIC DOMAINS ARE TRANSFERRED FROM THE RECORDING LAYER TO THE REPRODUCING LAYER

(75) Inventors: Atsushi Yamaguchi, Ogaki; Naoyuki Takagi, Fuwa-gun; Yoshiharu Uchihara, Ogaki; Satoshi Sumi, Gifu; Hiroyuki Awano, Noda; Hiroshi Shirai, Kitasohma-gun; Hitoshi Watanabe, Yuuki-gun; Norio Ohta, Tsukuba-gun, all of (JP)

(73) Assignees: Sanyo Electric Co., Ltd., Moriguchi; Hitachi Maxell, Ltd., Ibaraki, both of (JP)

( * ) Notice: Subject to any disclaimer, the term of this patent is extended or adjusted under 35 U.S.C. 154(b) by 0 days.

(21) Appl. No.: 09/108,317

(22) Filed: Jul. 1, 1998

(30) Foreign Application Priority Data

Jul. 4, 1997 (JP) .................................................. 9-180034

(51) Int. Cl.$^7$ ...................................................... G11B 11/00
(52) U.S. Cl. ............................................. 369/13; 369/53.2
(58) Field of Search ........................... 369/13, 14, 110.01, 369/116, 44.26, 275.1, 44.27, 275.2, 275.3, 288, 283, 284, 286, 47.1, 47.15, 53.2, 59.1; 360/59, 114; 428/694 ML

(56) References Cited

U.S. PATENT DOCUMENTS

| 5,473,583 | * | 12/1995 | Itoh et al. ........................... 369/13 |
| 5,579,294 | * | 11/1996 | Ohta et al. .......................... 369/58 |
| 5,909,410 | * | 6/1999 | Awano et al. ....................... 369/13 |
| 5,986,977 | * | 11/1999 | Birukawa et al. ................. 369/13 |

\* cited by examiner

Primary Examiner—Ali Neyzari
(74) Attorney, Agent, or Firm—Armstrong, Westerman, Hattori, McLeland & Naughton, LLP

(57) ABSTRACT

A magneto-optical recording medium which includes a reproducing layer. When a laser beam is irradiated to the magneto-optical recording medium, a magnetic domain in a recording layer is transferred, through enlargement, to a reproducing layer increased in temperature. The magneto-optical recording medium further includes a calibration area that has a calibration magnetic domain recorded in a pre-determined pattern in the recording layer. In a reproducing apparatus, a laser beam of an optical head is adjusted in output depending upon a reproduced signal obtained by reproducing the calibration magnetic domain.

12 Claims, 10 Drawing Sheets

F I G. 3
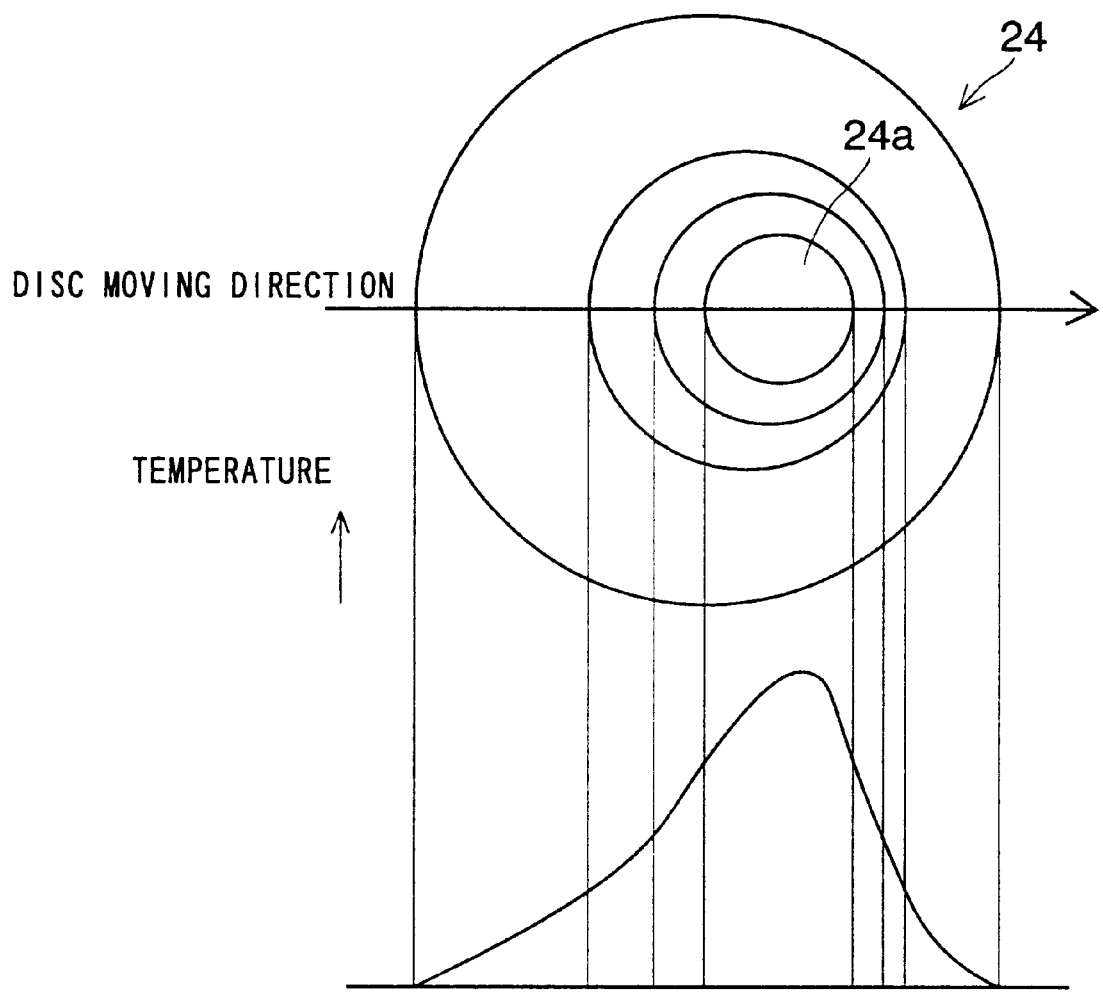

MAGNETO-OPTICAL RECORDING MEDIUM AND RECORDING/REPRODUCING APPARATUS THEREFOR IN WHICH RECORDED MAGNETIC DOMAINS ARE TRANSFERRED FROM THE RECORDING LAYER TO THE REPRODUCING LAYER

BACKGROUND OF THE INVENTION

1. Field of the Invention

This invention relates to a magneto-optical recording medium and recording/reproducing apparatus used therefor, and more particularly to a magneto-optical recording medium having a recording layer and a reproducing layer so that microscopic magnetic domains can be recorded within the recording layer during recording and the magnetic domains thus recorded are magnified and transferred to the reproducing layer during reproduction, and recording/reproducing apparatus used therefor.

2. Description of the Related Art

There are magneto-optical recording mediums and recording/reproducing apparatuses of this kind disclosed as examples, e.g. in Japanese Laying-open Patent Publication No. H6-295479 (Oct. 21, 1994), G11B 11/10, Japanese Laying-open Patent Publication No. H8-7350 (Jan. 12, 1996), G11B 11/10, and so on.

The magneto-optical recording medium 10 includes a recording layer 14 and a reproducing layer 16 each formed by a magnetic layer on a substrate 12, as shown in FIG. 1. The recording layer 14 and the reproducing layer 16 have an intermediate layer 18 therebetween. A protecting layer 20 is formed on the recording layer 14. Incidentally, the intermediate layer 18 herein is formed by a non-magnetic layer, but can be by a magnetic layer. Meanwhile, the recording layer 14 and the reproducing layer 16 can be desirably formed of a known magnetic material.

Referring to FIG. 2, microscopic magnetic domains (hereinafter referred to also as "record magnetic domains") 22 are recorded within the recording layer 14 of this magneto-optical recording medium 10 by using a magnetic head (not shown.). During reproduction, the record magnetic domain 22 in the recording layer 14 is transferred to the reproducing layer 16 by irradiating a laser beam 24 as shown in FIG. 3. More specifically, the laser beam 24 has a temperature profile as shown in FIG. 3, wherein the temperature assumes a maximum at and close to a spot center and gradually decreases toward the outside. However, where the magneto-optical recording medium is for example an optical disc, the temperature profile on the magneto-optical recording medium is different in slant at between the frontward and the rearward with respect to a moving direction. That is, the slant is more abrupt at the rearward than the frontward. By utilizing such a temperature profile by the laser beam 24, the magneto-optical recording medium 10 is raised in temperature at only a desired point thereof.

Returning to FIG. 2(A), if a laser beam 24 is irradiated to the magneto-optical recording medium 10, the magneto-optical recording medium 10 is increased in temperature according to a temperature profile as shown in FIG. 3. Here, the reproducing layer 16 is formed of a magnetic layer assuming rich in sub-lattice magnetization of transition metals and as a magnetic thin film with perpendicular magnetization over a range from a room temperature to a Curie temperature Tc. Accordingly, when the laser beam 24 is irradiated, the reproducing layer 16 is increased in temperature and decreases in coercive force. This causes the record magnetic domain 22 of the recording layer 14 to be transferred, due to static magnetic coupling, through the intermediate layer 18 to the reproducing layer 16, thus forming a transferred magnetic domain (hereinafter referred also to as "seed magnetic domain") 26 within the reproducing layer 16. The transferred or seed magnetic domain 26 is formed at a location corresponding to the record magnetic domain 22. After forming the seed magnetic domain 26 within the reproducing layer 16, an external magnetic field Hep is applied thereto by a not-shown magnetic head, as shown in FIG. 2(B). This external magnetic field Hep is an alternating magnetic field, and applied for at least one period, preferably 2–4 period, while one minimum sized magnetic domain is passing through a hot spot 24a (see FIG. 3) formed by the laser beam 24. If the alternating or external magnetic field Hep applied is in a same direction (same polarity) as the transferred magnetic domain 26, the seed magnetic domain 26 is enlarged in magnetic-domain diameter to provide enlarged magnetic domains 26a and 26b, resulting in transfer of the record magnetic domain 22 through enlargement. If a reproducing laser beam is irradiated to the transferred magnetic domain 26 and the enlarged magnetic domains 26a and 26b by using an optical head (not shown), a state of magnetization in the reproducing layer 16, i.e. a record signal, is reproduced.

In such a magneto-optical recording medium, there is tendency of transfer error to occur as the size of the record magnetic domain 22 within the recording layer decreases in size. This is due to decrease of resolution as the transferred magnetic domain area 26 within the reproducing layer 16 becomes greater than the diameter of the record magnetic domain. On the other hand, the size of the transferred magnetic domain 26 of the reproducing layer 16 is determined by the size of a hot spot of the laser beam 24. In order to increase the record density by decreasing the size of the record magnetic domain 22, there is a necessity of decreasing the size of the hot spot 24a of the laser beam 24, that is, the size of the transferred magnetic domain 26 within the reproducing layer 16.

The laser beam has a temperature profile variable depending upon an output of the laser beam. Accordingly, the decrease in size of the hot spot 24a only require the reduction in output of the laser beam 24. However, the laser beam output has an effect upon reproducibility, which has to be taken into consideration for optimal setting.

In any of the prior arts, however, nothing has been considered as to optimize the laser beam output from such a point of view.

SUMMARY OF THE INVENTION

Therefore, it is a primary object of this invention to provide a magneto-optical recording medium and recording/reproducing apparatus used therefor, which can optimize the output of a laser beam.

It is another object of this invention to provide a magneto-optical recording medium and recording/reproducing apparatus that can further enhance the recording density.

A magneto-optical recording medium according to this invention, which allows a magnetic domain in a recording layer to be transferred, through enlargement, to a reproducing layer raised in temperature by irradiation of a laser beam, comprises: a calibration area including a calibration magnetic domain recorded in a predetermined pattern in the recording layer.

The calibration magnetic domain may include an isolated magnetic domain recorded at an interval not to detect at a same time the magnetic domain in plurality of number.

A reproducing apparatus according to this invention, comprises: an optical head for irradiating the laser beam to the magneto-optical recording medium and reproducing the calibration magnetic domain to output a reproduced signal; and an output adjusting means for causing the optical head to adjust an output of the laser beam depending upon the reproduced signal.

This invention is, further, a recording/reproducing apparatus for a magneto-optical recording medium including a recording layer and a reproducing layer, comprising: a recording means for recording a calibration magnetic domain in a predetermined pattern in the recording layer by means of a magnetic head; a transfer means for transferring the calibration magnetic domain to the reproducing layer by irradiating a laser beam; a reproducing means for reproducing a transferred calibration magnetic domain transferred to the reproducing layer to output a reproduced signal; and a laser output adjusting means for adjusting an output of the laser beam depending upon the reproduced signal.

A calibration area is formed on the magneto-optical recording medium. This calibration area may be previously formed. Where using a recording/reproducing apparatus, calibration areas can be provided. The magneto-optical recording medium is formed by 2. A magneto-optical recording medium according to claim 1, wherein the calibration magnetic domain includes an isolated magnetic domain recorded at an interval greater than a spot diameter of the laser beam.

The calibration area includes calibration magnetic domains formed at an interval of a given distance or greater (specifically, at an interval not to detect at a same time the magnetic domain in plurality of number).

By reproducing the calibration magnetic domain in the calibration area, the output adjusting means adjusts the output of the laser beam depending upon the reproduced signal, to thereby set (optimize) a laser beam output by which a transferred magnetic domain area formed in the reproducing layer is minimized.

According to this invention, since the laser beam output can be optimized, the recording in the recording layer is possible with higher density.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a method to reproduce magnetic domains recorded in a recording layer of the magneto-optical recording medium of FIG. 1, wherein FIG. 2(A) shows a state before enlargement while FIG. 2(B) a state after enlargement;

FIG. 3 is an illustrative view showing, together with temperature distribution, a spot of a laser beam irradiated for reproduction using the magneto-optical recording medium;

DETAILED DESCRIPTION OF THE PREFERRED EMBODIMENTS

Figure 1:
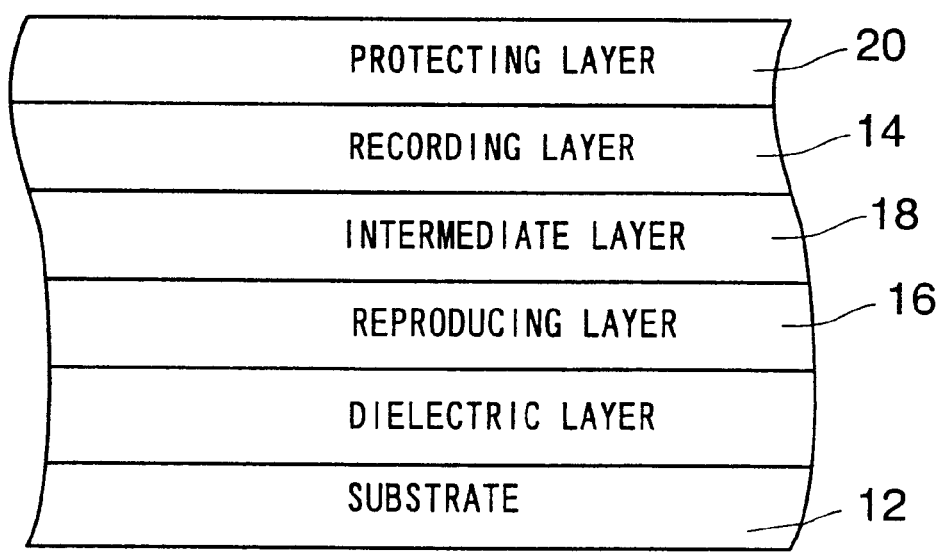
FIG. 1 is a sectional illustrative view showing one example of a magneto-optical recording medium employed in this invention.
Figure 4:
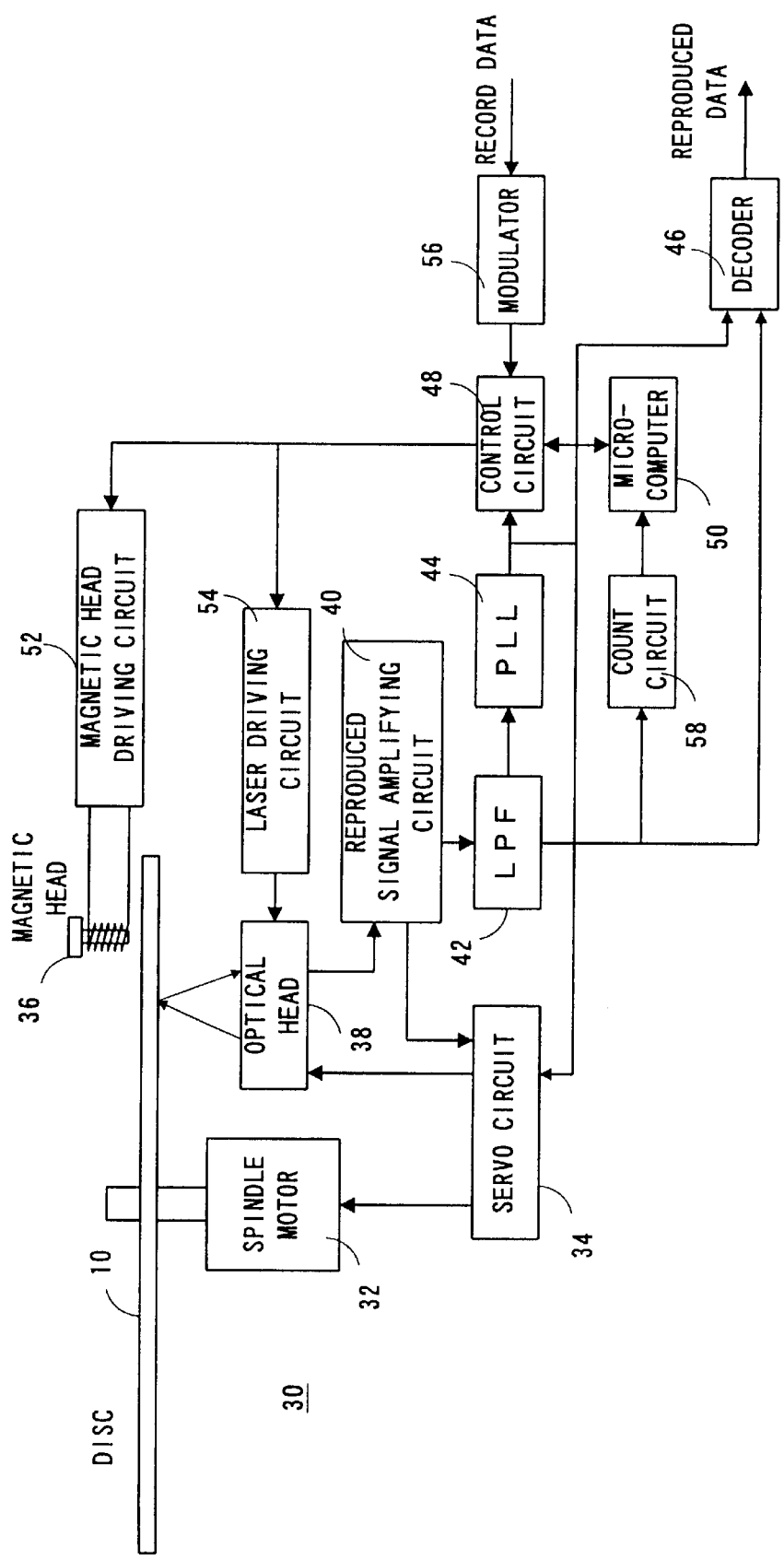
FIG. 4 is a block diagram showing one embodiment of this invention.

Referring to FIG. 4, a recording/reproducing apparatus 30 for a magneto-optical recording medium in this embodiment includes a spindle motor 32 to rotate a magneto-optical recording medium or optical disc 10. This spindle motor 32 is controlled by a servo circuit 34. At the above of the magnet-optical recording medium or disc 10, a magnetic head 36 is provided out of contact with the disc 10. A similar optical head is provided at the beneath of the disc 10. The magnetic head 36 is utilized not only to form record magnetic domains 22 (FIG. 2) within a recording layer 14 (FIG. 1) of the disc 10 but also to apply an alternating magnetic field for enlarging a magnetic domain 26 transferred to a reproducing layer 16. The optical head 38 includes, as is well known, a laser device, a light receiving device, a polarizing beam splitter, and so on. The laser device (not shown) irradiates a laser beam onto the magneto-optical recording medium or disc 10 during reproduction, as stated before. Meanwhile, the light receiving device, e.g., photodiodes, of two in number detect respective reflected beams different in polarization axis, depending upon a magnetizing polarity of a record or transferred magnetic domain (enlarged magnetic domain), thereby outputting a reproduced signal (RF signal).

The reproduced signal from the optical head 38 is supplied to a reproduced signal amplifying circuit 40. The reproduced signal amplifying circuit 40 supplies a tracking-error signal and a focussing-error signal contained in the reproduced signal to a servo circuit 34. The servo circuit 34 controls the spindle motor 32 to rotate at a predetermined rotational speed depending upon the tracking and focussing signals as well as a clock signal (stated later). The servo circuit 34 also controls movement of an objective lens (not shown) included in the optical head 38. That is, the servo circuit 34 performs tracking servo and focussing servo.

The reproduced signal, amplified by the reproduced signal amplifying circuit 40, is also subjected to integration by a low-pass filter 42 and then supplied to a PLL (Phase-Locked Loop) 44 as a clock generating circuit and to a decoder 46. The PLL 44 adjusts the phase and frequency of an oscillation clock according to a comparison in phase between a reproduced clock contained in the reproduced signal and an oscillation clock from a VCO (Voltage-Controlled Oscillator: not shown), to thereby output the oscillation clock as a system clock. This system clock is supplied to the servo circuit 34 as stated before, and also to a control circuit 48 and the decoder 46.

The decoder 46 decodes an output signal (reproduced signal) from the low-pass filter 42 according to the clock, thereby outputting reproduction data.

The control circuit 48 controls a magnetic head driving circuit 52 and a laser driving circuit 54, under the control of a micro-computer 50. The magnetic head driving circuit 52 includes a pulse signal source (not shown) to generate a pulse signal for writing a record magnetic domain into the recording layer 14 (FIG. 1) through the magnetic head 36, and an alternating current signal source (not shown) to generate an alternating magnetic field by the magnetic head 36.

That is, to the control circuit 48 supplied modulated record data so that the control circuit 48 supplies a signal to the magnetic head driving circuit 52 according to the modulated record data. In response thereto, the magnetic head driving circuit 52 controls the pulse signal source to supply a drive signal to the magnetic head 36 such that a record magnetic domain is recorded into the recording layer of the magneto-optical recording medium or disc 10 in compliance with the record data. Incidentally, the frequency of an alternating current outputted by an alternating signal source, i.e., alternating magnetic field, is for example at 2.0 MHz in this embodiment. It is, however, possible to arbitrarily alter the frequency.

Figure 5:
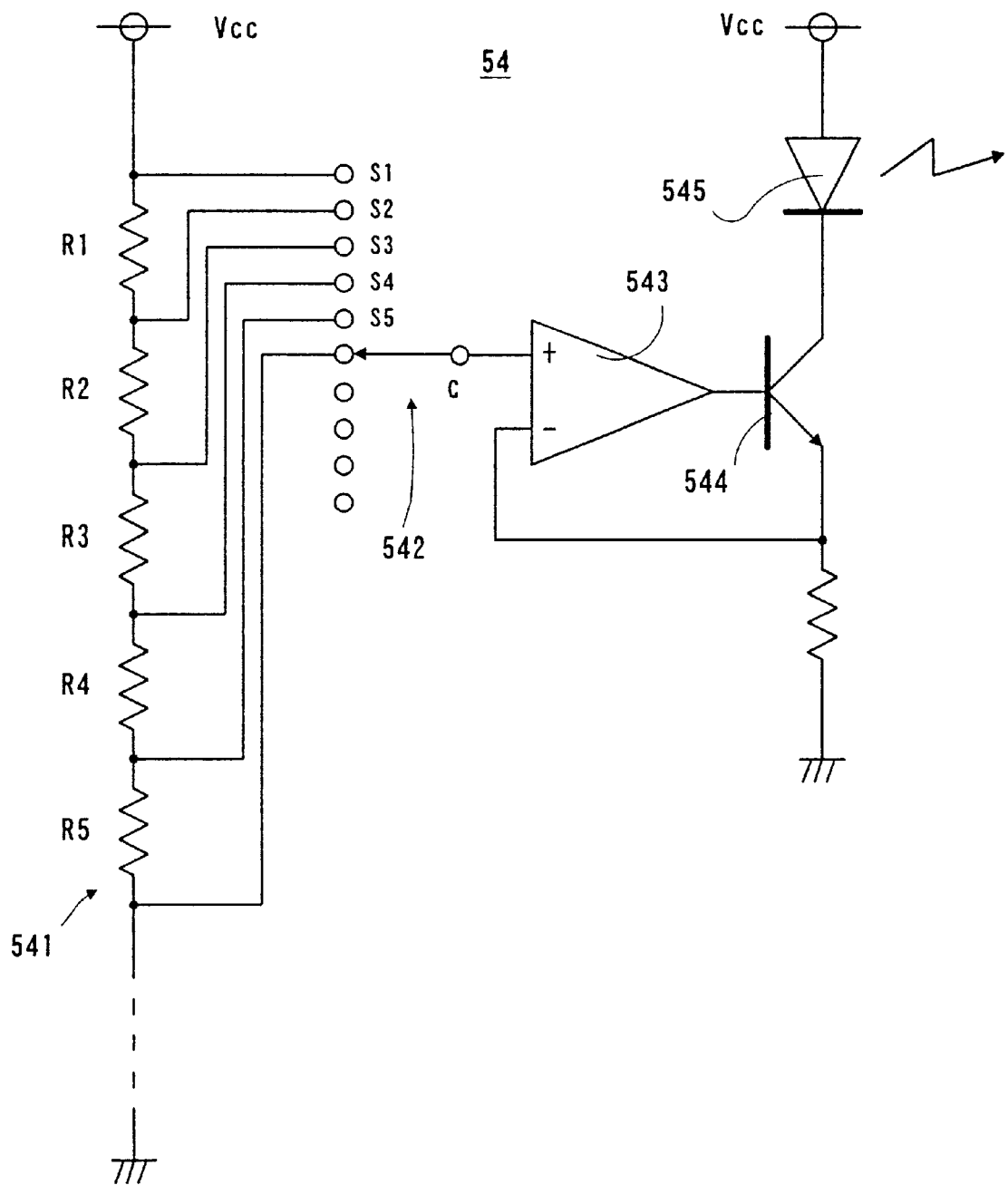
FIG. 5 is a circuit diagram showing one example of a laser drive circuit in the FIG. 4 embodiment.

The laser driving circuit 54, as shown in detail in FIG. 5, includes a resistance circuit 541 having a plurality of resistance elements R1, R2, R3, . . . connected in series between a power supply Vcc and a ground. The resistors R1, R2, R3, . . . have series connecting points, the respective of which are connected with fixed contacts S1, S2, S3, . . . of a switch 542. The switch 542 has a movable contact C to be switched over to any of the fixed contacts S1, S2, S3, . . . according to a switching signal supplied from the control circuit 48. Through the movable contact C of the switch 542 is outputted a different voltage depending upon which fixed contact is connected to the same contact. The output voltage of the switch 542 is supplied, through an amplifier 543, to a base of a transistor 544. A laser device 545 is connected between a collector of the transistor 544 and the power supply Vcc. The transistor 544 has an emitter grounded through an emitter resistance.

In this laser driving circuit 54, when the movable contact C of the switch 542 is changed over by the control circuit 48, an output voltage of the amplifier 543, i.e. a base voltage of the transistor 544, is varied thereby to vary a drive current to be flowed through the laser device. It is therefore possible to adjust an output of a laser beam given from the laser device 545.

Meanwhile, the reproduced signal, having passed through the low-pass filter 42, is supplied to a count circuit 58. This count circuit 58 counts the number of peaks contained in the reproduced signal (corresponding to one polarity of an alternating magnetic field applied by the magnetic head 36), as will be explained in detail later. Specifically, the count circuit 58 includes a waveform-shaping circuit for converting the reproduced signal into a pulse signal, and a counter for counting on the pulse signal outputted from this equalizer. The value counted by the counter is supplied to the micro-computer 50. The micro-computer 50 supplies a command signal to the control circuit 48 depending upon the count value, as explained later, and controls a drive current to the laser driving circuit 54, i.e. laser beam output.

In the recording/reproducing apparatus 30 in this embodiment, a calibration area 11 is formed on the magneto-optical recording medium or disc 10, as shown in FIG. 6 to FIG. 9. The calibration area 11 is an area used to adjust an output of an laser beam by reproducing a record signal contained in the same area. Note that, when employing an apparatus having no recording function, i.e., an reproduction-exclusive apparatus, tit is possible to utilize a magneto-optical recording medium or disc previously formed with such calibration areas.

Figure 6:
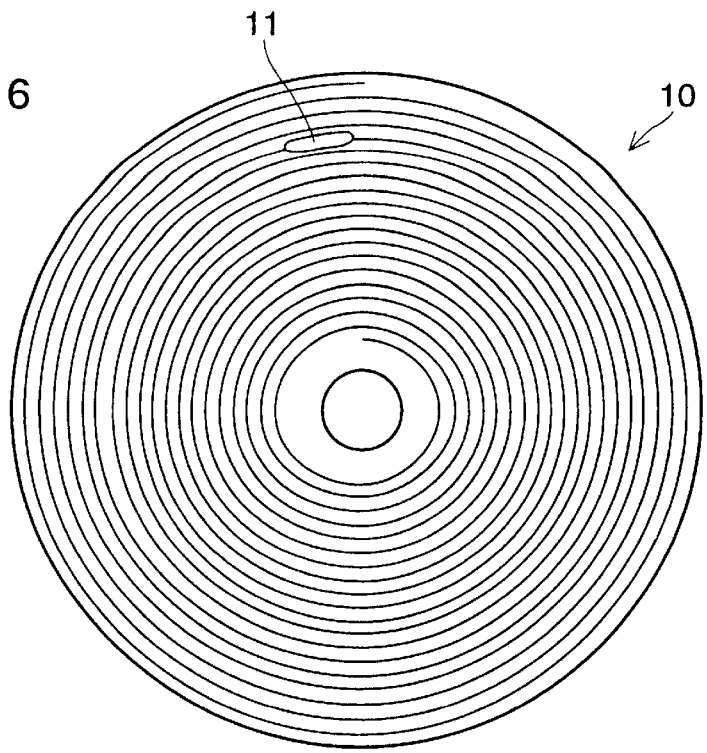
FIG. 6 is an illustrative view showing one example of arrangement of a calibration area formed according to this invention or previously on an optical disc.
Figure 7:
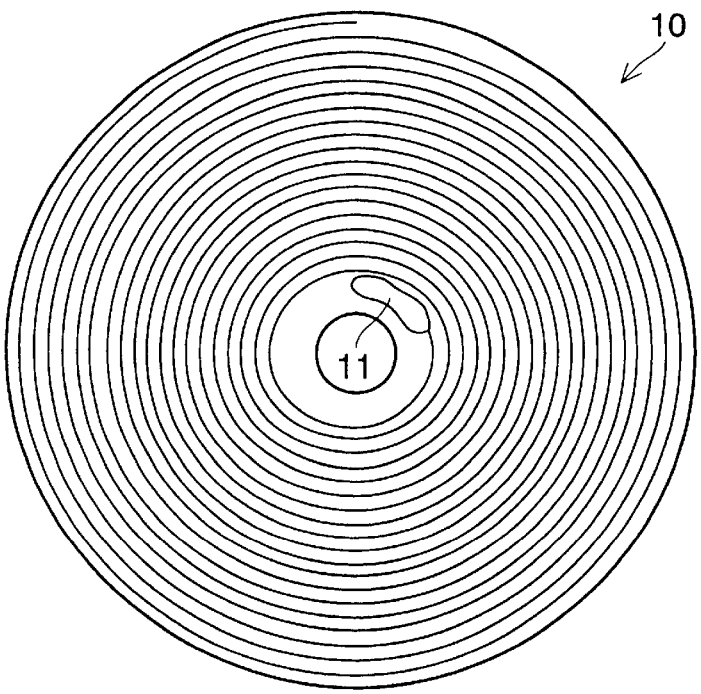
FIG. 7 is an illustrative view showing another embodiment of arrangement of a calibration area formed according to this invention or previously on the optical disc.
Figure 8:
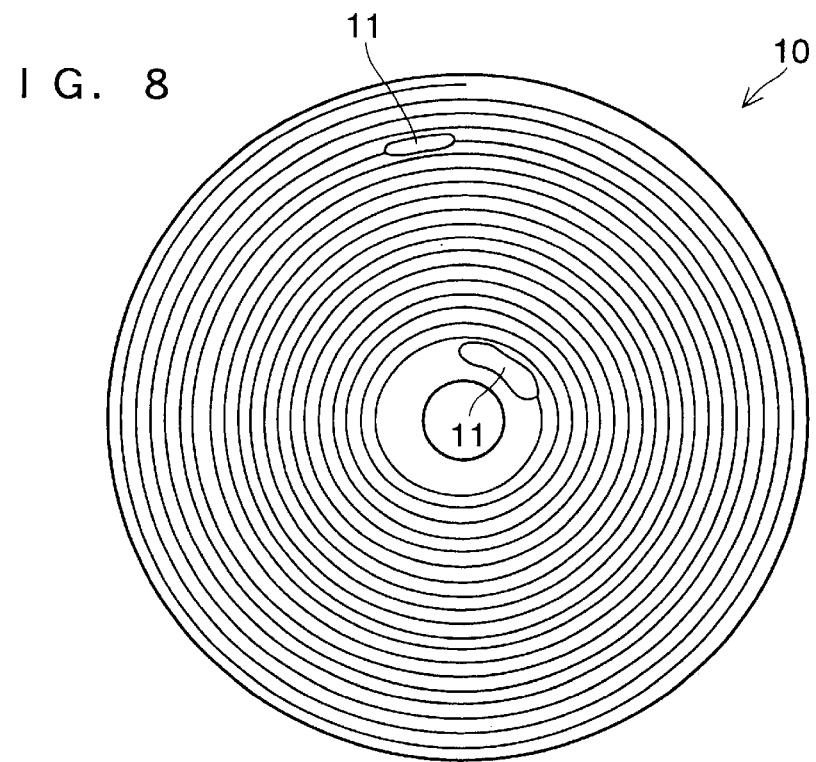
FIG. 8 is an illustrative view showing still further embodiment of arrangement of a calibration area formed according to this invention or previously on the optical disc.

In an embodiment of FIG. 6, a calibration area 11 is formed at a location immediately behind a TOC area on the disc 10. In an embodiment of FIG. 7, a calibration area 11 is formed at an innermost of the disc 10. In an embodiment of FIG. 8, calibration areas 11 are formed at respective locations of immediately behind a TOC area and the innermost of the disc 10. In an embodiment of FIG. 9, calibration areas 11 are set at respective beginnings of zones on the disc 10.

Figure 9:
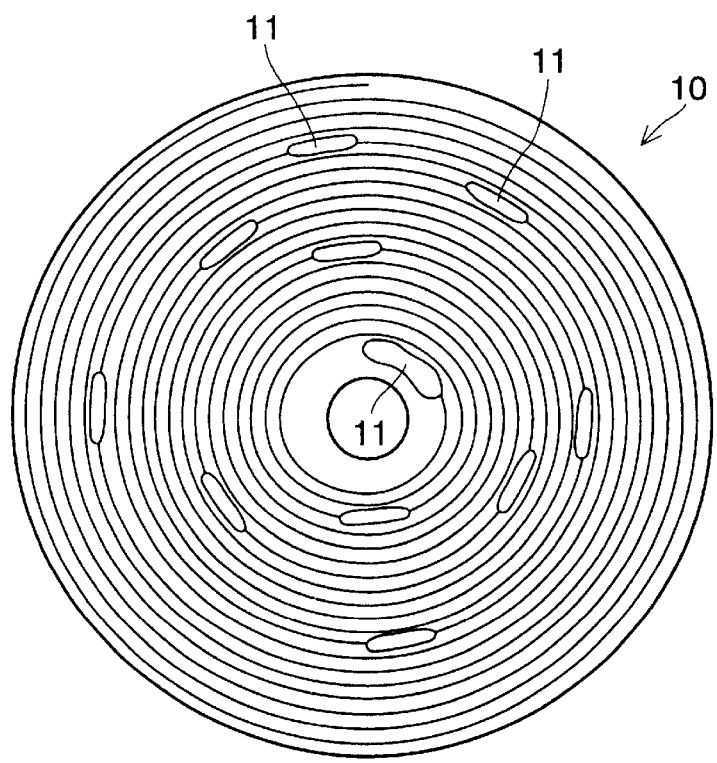
FIG. 9 is an illustrative view showing another embodiment in arrangement of a calibration area formed according to this invention or previously on the optical disc.

By utilizing a disc 10 having such calibration areas 11, calibration of laser beam output adjustment can be effected at a desired timing. For example, an optimal output of a laser beam can be determined by effecting a calibration at a time of initializing the disc. Otherwise, calibration can be carried out when loading a disc onto a recording/reproducing apparatus or a reproducing apparatus. In particular, if the disc of FIG. 9 is utilized, the laser beam output can be optimized by calibrations each time any of the zones comes to reproduction.

Figure 10:
FIG. 10 is an illustrative view showing an external magnetic field (pulses) outputted from a magnetic head when forming a calibration layer.
Figure 11:
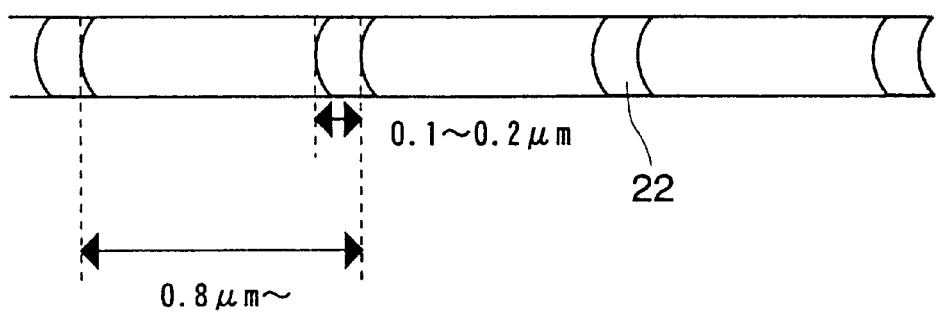
FIG. 11 is an illustrative view showing recorded magnetic domains formed at the calibration area in the recording area.

Now, explanations will be made for a method to form a calibration area in the FIG. 4 embodiment. To form a calibration area, the micro-computer 50 sets a calibration-signal recording mode. In this mode, the micro-computer 50 sends a command signal to the control circuit 48 to output a calibration signal. In response thereto, the control circuit 48 enables the pulse signal source (not shown) of the magnetic head driving circuit 52. Consequently, the magnetic head driving circuit 52 supplies a pulse signal as shown in FIG. 10 to the magnetic head 36. That is, the magnetic head 36 responds to an intermittent pulse signal as shown in FIG. 10 to apply an external magnetic field to the disc 10. Accordingly, recorded magnetic domains 22 are created within the recording layer 14 (FIG. 1) on the disc 10, as shown in FIG. 11. The record magnetic domains 22 have a size corresponding to a minimum magnetic domain recordable on the disc, and an interval therebetween selected near equal to or greater than a spot diameter 24a (FIG. 2) of a laser beam 24. That is, calibration-signal magnetic domains, which are to be recorded at a calibration area 11 in the recording layer 14, are isolated magnetic domains formed at an interval greater than the spot diameter of the laser beam. Note that, in the FIG. 11 embodiment, the record magnetic domains has a size, for example, of approximately 0.1–0.2 $\mu$m, and at an interval, for example, of 0.8 $\mu$m or greater.

Now, a calibration mode will be explained with reference to FIG. 12 and FIG. 13, in which a laser beam is optimized in output (calibration) by using a disc 10 formed with a calibration area 11 (FIG. 6 to FIG. 9). FIGS. 13(A), (B) and (C) respectively demonstrate reproduced signal waveforms observed when the output of a laser beam is varied as, e.g. 1.4 mW, 1.2 mW and 1.0 mW, with the frequency of an external alternating magnetic field Hep kept at constant.

In the calibration mode, when a disc 10 is loaded, the micro-computer 50 sets, at a first step S1, a frequency of an alternating external magnetic field Hep (FIG. 3) outputted from the magnetic head 36. Although this frequency can be desirably set as stated before, the frequency in this embodiment is set at 2.0 MHz. Then, the micro-computer 50, at next step S2, makes initial setting of an output Pr of reproducing power of laser beam 24. Although this initial output value is set at approximately 0.6 mW, this initial value also can be desirably set.

Figure 2:
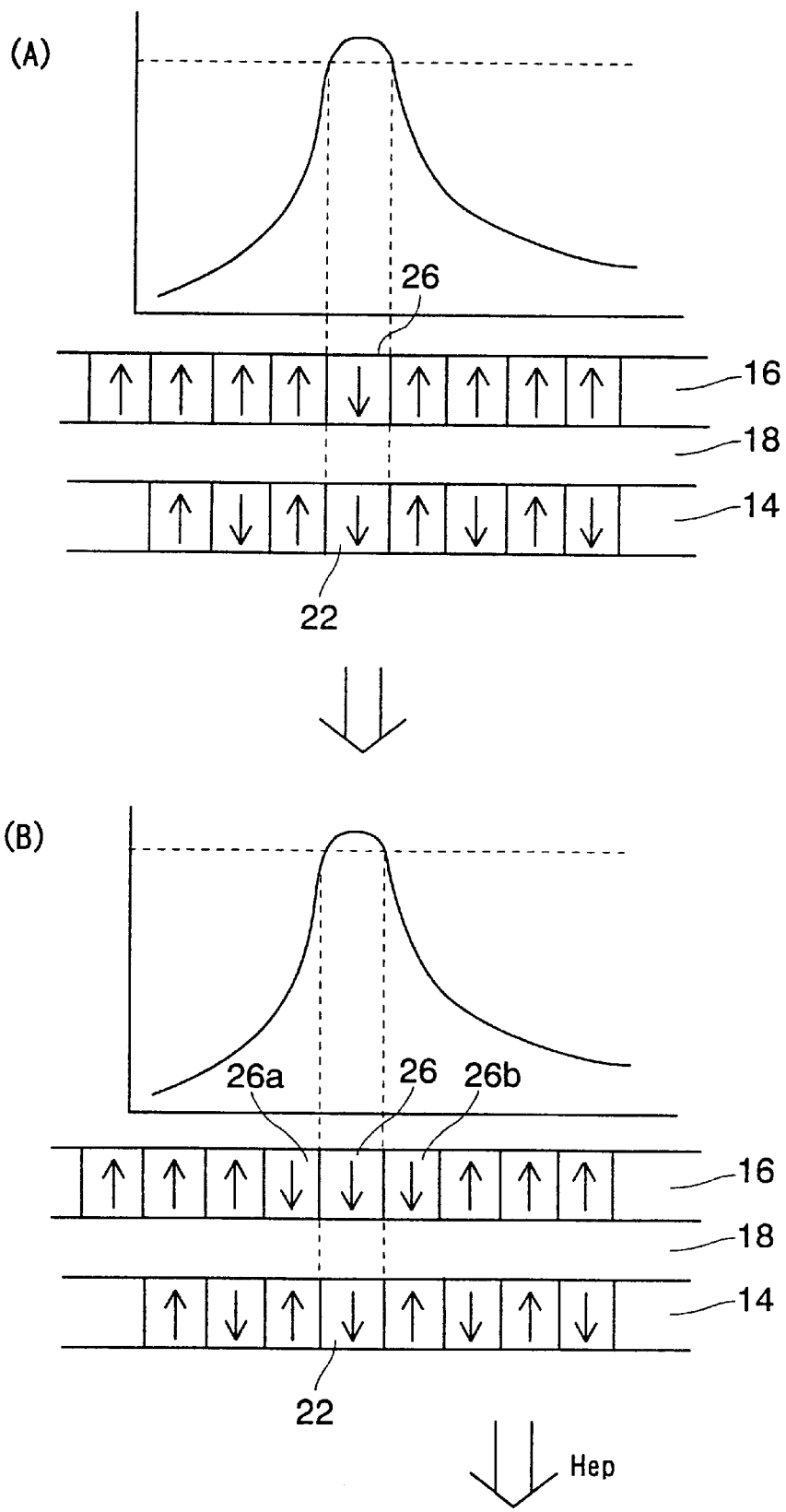

After making the initial setting as above, the micro-computer 50 at a step S3 performs reproduction on the calibration-signal magnetic domain recorded as stated before in the calibration area 11 (FIG. 6 to FIG. 9). That is, the micro-computer 50 enables the laser driving circuit 54 through the control circuit 48, in a manner similar to usual reproduction, to thereby drive the laser device 54S (FIG. 5) at the initial power set at the step S2. The driving the laser device 54S causes the magnetic head 38 to output a laser beam 24 (FIG. 2). Consequently, the calibration magnetic domain 22 in the recording layer 14 is transferred to the reproducing layer 16, as explained before, thus forming a seed magnetic domain withing the reproducing layer 16, due to a calibration-signal magnetic domain. Then the micro-computer 50 sends a command signal to the control circuit 48. Accordingly, the magnetic head 36 produces an alternating magnetic field at an output set by the step S1. As the intensity of the magnetic field exceeds a magnetic domain-wall coercive force Hw, the seed magnetic domain 26 is enlarged to form enlarged magnetic domain portions 26a and 26b. That is, the calibration-signal magnetic domain is transferred through enlargement. In response to a laser beam output at that time, a reproduced signal is provided through the optical head 38, for example as shown in FIG. 13(A) to FIG. 13(C). This reproduced signal has peaks in number dependent upon the frequency of the alternating magnetic field. More specifically, when a laser beam 24 is irradiated, a seed magnetic domain 26 is created within the reproducing layer 16 due to a leak magnetic field from the recording layer 14 through the intermediate layer 18. This seed magnetic domain 26 turns into an enlarged magnetic domain of from 26a to 26b, for example, by a positive-polarity magnetic field of the external alternating magnetic field Hep, thus forming peaks in the reproduced signal.

The number of peaks in the reproduced signal is counted by the above-stated count circuit 58, and a value N of the count is inputted, at a step S4, to the micro-computer 50.

The micro-computer 50 determines, at a next step S5, whether or not the count value N is "0", i.e. N=0?. If N is not "0", the micro-computer 50 sets, at a next step S6, the output Pr of the laser beam 24 to "Pr −ΔP" (Pr=Pr −ΔP). At this time, the decrement value "ΔP" of the output is set, for example, at approximately 0.2 mW–0.5 mW. That is, the count value N of not "0" is to be considered as excessively high laser beam power. Accordingly, the micro-computer 50 at a step S6 decrements the laser beam power by a constant amount for each time. At a step S7, the calibration area 11 is again reproduced similarly to the step S3, and the count value N is fetched from the count circuit 58, similarly to the step S4. At a step S9, a determination of N=0? is executed, similarly to the step S5. At this step S9, if the determination is "YES", the micro-computer 50 at a next step S10 increments the power of the laser beam 24 (Pr=Pr+ΔP). The output increment value "ΔP" at this time is set, for example, at approximately 0.2 mW–0.5 mW. However, the value may be the same as the decrement value, or to a different value. At the step S9, if "NO" is determined, the micro-computer 50 returns to the step S6, to repeat the steps S6–S9.

That is, at the steps S6–S9, the micro-computer 50 determines an output Pr of the laser beam 24 at which the count value N of the count circuit 58, i.e. the number of peaks in the reproduced signal, becomes "0". If the count value N becomes "0", the output of the laser beam is increased at a step S10. By executing the steps S6–S9, the output of the laser beam is adjusted until the number of peaks of the reproduced signal, i.e. the count value N of the count circuit 58, becomes a minimum value other than "0". For example, in the embodiment of FIG. 13 the laser beam power set by the step S10 may be 1.0 mW.

If the count value N is "0" at the step S5, the micro-computer 50 sets, at a next step S11, the output Pr of the laser beam 24 to "Pr+ΔP" (Pr=Pr+ΔP). Since the count value N of "0" means a low output of the laser beam, the micro-computer 50 increments, at a step S11, the laser beam power by a constant amount for each time. Then, the micro-computer 50 again reproduces, at a step S12, a calibration area 11 similarly to the step S3 or S7, and then fetches the count value N from the count circuit 58 at a step S13. It is determined if N=0? at a step S14. If the determination is "YES" at this step S14, the micro-computer 50 returns to the step S11 to repeat the steps S11–S14.

That is, by executing the steps S11–S14, the micro-computer 50 makes adjustment on the laser beam output until the count value N of the count circuit 58, i.e. the number of peaks in the reproduced signal, reaches a minimum value other than "0".

Figure 12:
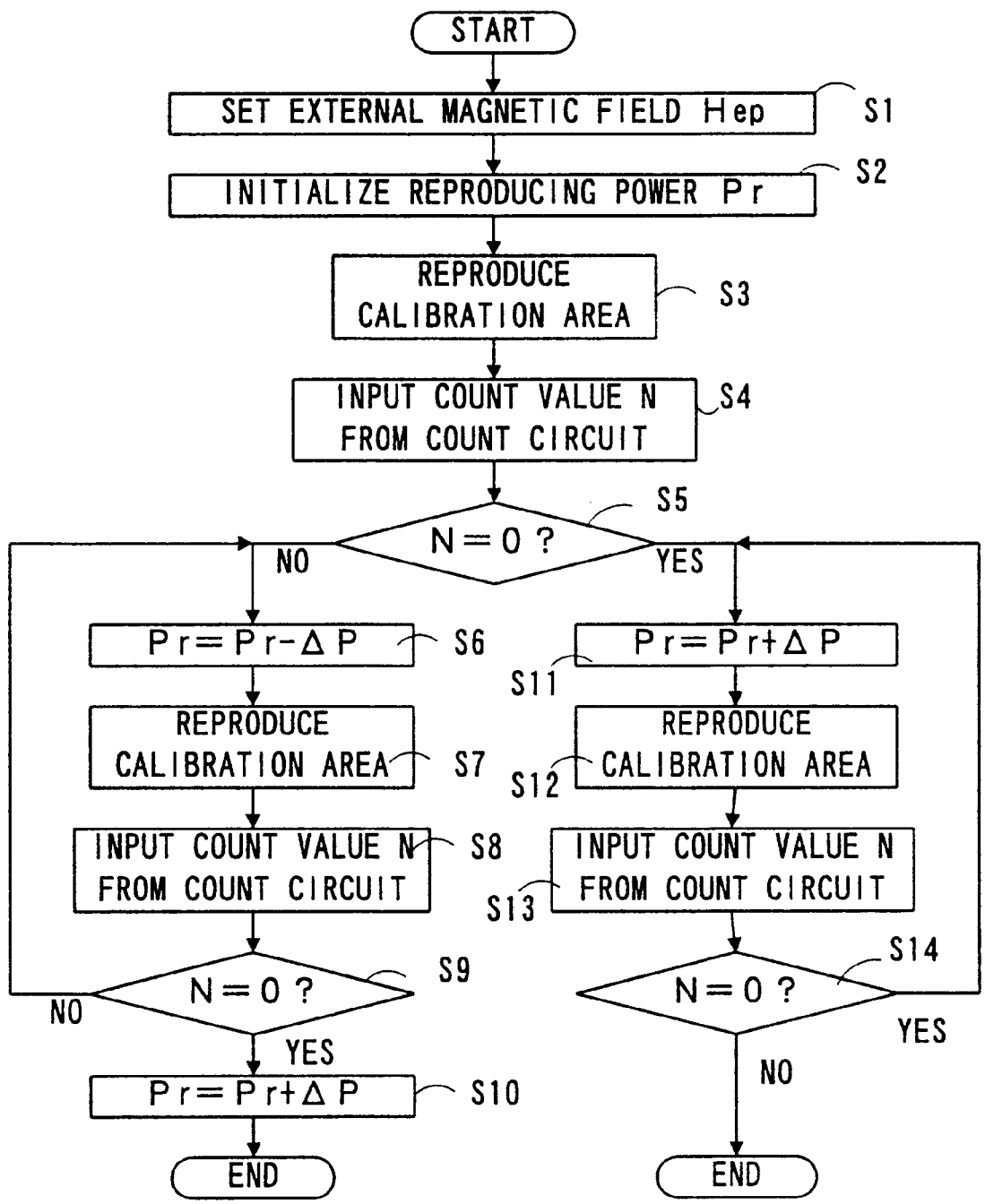
FIG. 12 is a flowchart showing a calibration mode in the FIG. 4 embodiment.
Figure 13:
FIG. 13 is wave form diagrams of a reproduced signal, respectively, showing that the reproduced signal is varied in the number of peaks in response to variation in output of a laser beam in the FIG. 4 embodiment.

Incidentally, in the example of FIG. 12, the minimum value other than "0" is "1" because the number of peaks and the reproduced signal decreases as "3", "2" and "1" as the laser beam output is gradually decreased. However, there is a case that the minimum value for the number of peaks other than "0" is at "2" or greater. For example, this is true for a case that the number of peaks varies as "4", "3", "2", "0" as the laser beam power decreases. In such a case, the micro-computer 50 determines the laser beam output at which the number of peaks is at "2".

In this manner, the optimization of the laser beam 24 (FIG. 3) output enables setting the size of a transferred magnetic domain area 26 in the reproducing layer to a required minimum, during reproduction. It is therefore possible to reduce the size of the magnetic domain in the recording layer 14 to a minimum extent, thereby realizing recordation with higher density.

Incidentally, the above embodiment used, as a reproducing layer, the magnetic layer assuming as a magnetic thin film with perpendicular magnetization in a temperature range of at least from a room temperature to a reproduction temperature. However, this reproducing layer may be by a magnetic layer assuming a magnetic thin film with in-plane magnetization at a normal temperature and a magnetic thin film with perpendicular magnetization at a raised temperature. In this case, there may be a case that an alternating external magnetic field is unnecessary to apply in order to enlarge the magnetic domain.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reproducing apparatus for reproducing from a magneto-optical recording medium on which a laser beam is irradiated to transfer, through enlargement, a magnetic domain in a recording layer to a reproducing layer raised in temperature, wherein said magneto-optical recording medium has a calibration area including a calibration-signal magnetic domain recorded in a predetermined pattern in said recording layer, comprising: an optical head for irradiating the laser beam to said magneto-optical recording medium and reproducing the calibration-signal magnetic domain to output a reproduced signal; and an output adjusting means for causing said optical head to adjust an output of the laser beam in response to the reproduced signal.

2. A reproducing apparatus according to claim 1, wherein the calibration-signal magnetic domain of said magneto-optical recording medium includes an isolated magnetic domain recorded at an interval not to detect at a same time the magnetic domain in plurality of number by the laser beam.

3. A reproducing apparatus according to claim 2, wherein the isolated magnetic domain is a minimum magnetic domain recordable on said magneto-optical recording medium.

4. A reproducing apparatus according to any of claims 1 to 3, wherein said reproducing layer comprises a magnetic layer assuming a magnetic thin film with perpendicular magnetization in a range of at least from a room temperature to a reproducing temperature, further comprising a magnetic head for generating an alternating magnetic field to enlarge a transferred calibration magnetic domain transferred to said reproducing layer, wherein said optical head has a laser device to output the laser beam, and outputs the reproduced signal in level in response to an intensity of the laser beam;

said output adjusting means includes an intensity detecting means for detecting an intensity of the reproduced signal, and a drive power control means for controlling drive power to said laser device in response to the intensity.

5. A reproducing apparatus according to claim 4, wherein the reproduced signal has peaks in number corresponding to the alternating magnetic field, the intensity detecting means includes a number detecting means for detecting a number of peaks contained in the reproduced signal, said drive power control means applying a driving power at which the peaks become minimum in number to said laser device.

6. A reproducing apparatus according to any of claims 1 to 3, wherein said reproducing layer is formed by a magnetic layer assuming as a magnetic thin film with a planar magnetization at a normal temperature and a magnetic thin film with vertical magnetization at a increased temperature, further comprising a magnetic head for generating an alternating magnetic field to enlarge a transferred calibration magnetic domain transferred to said reproduced layer, wherein said optical head has a laser device to output the laser beam, and outputs the reproduced signal having a level in response to an intensity of the laser beam, said output adjusting means including an intensity detecting means for detecting an intensity of the reproduced signal, and a drive power control means for controlling a drive power to said laser device in response to the intensity.

7. A reproducing apparatus according to claim 6, wherein the reproduced signal has peaks in number corresponding to the alternating magnetic field, said intensity detecting means including a number detecting means for detecting a number of peaks contained in the reproduced signal, said drive power control means applying a drive power at which the peaks becomes minimum in number to said laser device.

8. A recording/reproducing apparatus for a magneto-optical recording medium including a recording layer and a reproducing layer, comprising:

a recording means for recording a calibration-signal magnetic domain in a predetermined pattern in said recording layer by means of a magnetic head;

a transfer means for transferring the calibration-signal magnetic domain to said reproducing layer by irradiating a laser beam;

a reproducing means for reproducing a transferred calibration-signal magnetic domain transferred to said reproducing layer to output a reproduced signal; and a laser output adjusting means for adjusting an output of the laser beam depending upon the reproduced signal.

9. A recording/reproducing apparatus according to claim 7, wherein said reproducing layer is formed by a magnetic layer assuming a magnetic thin film with vertical magnetization in a range of from a room temperature to a reproducing temperature, said magnetic head generating an alternating magnetic filed to enlarge the transferred calibration-signal magnetic domain, further comprising an optical head including a laser device to output the laser beam, said optical head outputting the reproduced signal having an intensity in response to an output of the laser beam, and said output adjusting means including an intensity detecting means for detecting the intensity of the reproduced signal and a drive power control means for controlling a drive power to said laser device in response to the intensity.

10. A recording/reproducing apparatus according to claim 9, wherein the reproduced signal has peaks in number corresponding to the alternating magnetic field, said intensity detecting means including a number detecting means for detecting a number of peaks contained in said reproduced signal, and said drive power control means applying a drive power at which the peaks become minimum in number to said laser device.

11. A recording/reproducing apparatus according to claim 7, wherein the reproducing layer is formed by a magnetic layer assuming as a magnetic thin film with planar magnetization at a normal temperature and a magnetic thin film with vertical magnetization at a raised temperature, said magnetic head generating an alternating magnetic field to enlarge th transferred calibration-signal magnetic domain, further comprising an optical head including a laser device to output a laser beam, said optical head outputting the reproduced signal having an intensity in response to an output of the laser beam, said output adjusting means including an intensity detecting means for detecting the intensity of the reproduced signal and a drive power control means for controlling a drive power to said laser device in response to the intensity.

12. A recording/reproducing apparatus according to claim 15, wherein the reproduced signal has peaks in number corresponding to the alternating magnetic field, said intensity detecting means including a number detecting means for detecting a number of peaks contained in the reproduced signal, and said drive power control means applying a driving power at which the peaks become minimum in number to said laser device.

* * * * *